United States Patent
Diaconu et al.

(10) Patent No.: US 10,802,715 B2
(45) Date of Patent: Oct. 13, 2020

(54) MOUNTING A DRIVE TO MULTIPLE COMPUTING SYSTEMS

(71) Applicant: Microsoft Technology Licensing, LLC, Redmond, WA (US)

(72) Inventors: Cristian Diaconu, Kirkland, WA (US); Alejandro Hernandez Saenz, Kirkland, WA (US); Naveen Prakash, Sammamish, WA (US); Alexander Budovski, Snohomish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 36 days.

(21) Appl. No.: 16/138,139

(22) Filed: Sep. 21, 2018

(65) Prior Publication Data
US 2020/0097172 A1 Mar. 26, 2020

(51) Int. Cl.
*G06F 3/06* (2006.01)
*G06F 11/20* (2006.01)

(52) U.S. Cl.
CPC .......... *G06F 3/0604* (2013.01); *G06F 3/0631* (2013.01); *G06F 3/0673* (2013.01); *G06F 11/2038* (2013.01); *G06F 2201/85* (2013.01)

(58) Field of Classification Search
CPC .... G06F 3/0504; G06F 3/0673; G06F 3/0631; G06F 11/2038; G06F 2201/85
See application file for complete search history.

(56) References Cited

U.S. PATENT DOCUMENTS

| | | |
|---|---|---|
| 8,312,231 B1 | 11/2012 | Li et al. |
| 8,954,645 B2 | 2/2015 | North et al. |
| 9,477,531 B2 | 10/2016 | Chawla et al. |
| 2001/0049707 A1* | 12/2001 | Tran ................ G06Q 10/10 715/256 |
| 2005/0243609 A1 | 11/2005 | Yang et al. |
| 2005/0289390 A1* | 12/2005 | Baba ............... G06F 11/2028 714/11 |

(Continued)

FOREIGN PATENT DOCUMENTS

WO 2011059811 A2 5/2011

OTHER PUBLICATIONS

Kovacs, Gali, "How to Mount Amazon S3 as a File System", Retrieved from: https://cloud.netapp.com/blog/amazon-s3-as-a-file-system, Jun. 27, 2017, 7 Pages.

(Continued)

*Primary Examiner* — Hiep T Nguyen
(74) *Attorney, Agent, or Firm* — Workman Nydegger (57) ABSTRACT

The mounting a drive to two or more computing systems. For instance, the drive may be mounted to a first computing system so as to be writable (and potentially readable) by the first computing system. But also, the drive is also mounted to one or more other computing systems so as to be only readable by those one or more computing systems. This allows for multiple computing systems to have access to the drive without risk that the data thereon will become corrupt. In one embodiment, the only user data stored on that drive is a single file of fixed size. Thus, even when user data is written into the fixed-size file, the management data stored (that keeps track of the files) on the drive does not change.

20 Claims, 8 Drawing Sheets

(56) References Cited

U.S. PATENT DOCUMENTS

| | | |
|---|---|---|
| 2011/0119668 A1 | 5/2011 | Calder et al. |
| 2011/0184993 A1* | 7/2011 | Chawla ............... G06F 9/45533 |
| | | 707/802 |
| 2013/0262801 A1 | 10/2013 | Sancheti et al. |
| 2013/0346532 A1 | 12/2013 | D'amato et al. |
| 2014/0359612 A1 | 12/2014 | D'amato et al. |
| 2016/0277425 A1* | 9/2016 | Gasparakis ............... H04L 9/32 |
| 2017/0068462 A1 | 3/2017 | Vajravel et al. |
| 2019/0286827 A1* | 9/2019 | Chang ..................... G06F 16/13 |

OTHER PUBLICATIONS

"International Search Report and Written Opinion Issued in PCT Application No. PCT/US2019/039098", dated Sep. 18, 2019, 10 Pages.

* cited by examiner

MOUNTING A DRIVE TO MULTIPLE COMPUTING SYSTEMS

BACKGROUND

Computing systems and associated networks have revolutionized the way human beings work, play, and communicate. Nearly every aspect of our lives is affected in some way by computing systems. The proliferation of networks has allowed computing systems to share data and communicate, vastly increasing information access. For this reason, the present age is often referred to as the "information age".

Computing systems typically require that data be stored and retrieved. A storage location or medium that a computing system may store data to is often termed a "drive". A traditional example of a drive is a physical hard drive. However, with the advent of networks and then cloud computing, various technologies have developed to present the appearance of a hard drive (a virtual hard drive) to a computing system, even though the actual storage used to emulate the hard drive is abstracted away from view, and may even be quite distributed.

Before a computing system may use a drive, the drive must be mounted to the computing system. Mounting is a process by with the structure on the drive is made accessible via the storage channels (e.g., a local file system) available on the computing system. Such a point of access is referred to as a "mount point". When mounting a writable volume, mounting also ensures that the computing system is capable of writing data to the drive honoring existing data structures within the drive thereby avoiding corruption of the drive. When mounting a readable volume, mounting ensures that the computing system may properly interpret the structure of the drive.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the mounting a drive to two or more computing systems. For instance, the drive may be mounted to a first computing system so as to be writable (and potentially readable) by the first computing system. But also, the drive is mounted to one or more other computing systems so as to be only readable by those one or more computing systems. This allows for multiple computing systems to have access to the drive without risk that the data on the drive will become corrupted. In one embodiment, the only user data stored on that drive is a single file of fixed size. Thus, even when user data is written into the fixed-size file, the management data stored (that keeps track of the files) on the drive does not change.

This mounting of a single drive to multiple computing systems may be especially beneficial in the case of there being a primary computing system that is supported by one or more fallback secondary computing systems. This might be the case when the primary computing system is running a very important process for which backup is necessary by one or more secondary computing systems. It is common in a variety of cloud applications to have a primary computing system with multiple secondary computing systems. If the primary computing system fails, failover occurs to one of the secondary computing systems, which will continue the process.

This ensures that the process has sufficient redundancy so that the process is highly available. In this case, the primary computing system is operating upon the data, while the secondary computing systems read data preparing for the day they might be called upon to become the primary computing system. If failover is necessary, one of the secondary computing systems may be selected as the primary, and the mounting of the drive to the secondary computing system may be augmented to a writable mounting also, or the secondary computing system may simply be notified that it is now the primary computing system. This significantly reduces the time required to perform failover since a drive need not now be mounted to the secondary computing system as part of the failover. The drive is already present, and available.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Therefore, these drawings depict only example embodiments of the invention and are not therefore to be considered to be limiting of the scope of the invention. With this in mind, example embodiments of the invention will be described and explained with reference to the accompanying drawings in which.

DETAILED DESCRIPTION

At least some embodiments described herein relate to the mounting a drive to two or more computing systems. For instance, the drive may be mounted to a first computing system so as to be writable (and potentially readable) by the first computing system. But also, the drive is also mounted to one or more other computing systems so as to be only readable by those one or more computing systems. This allows for multiple computing systems to have access to the drive without risk that the data thereon will become corrupted. In one embodiment, the only user data stored on that drive is a single file of fixed size. Thus, even when user data is written into the fixed-size file, the management data (that keeps track of the files) stored on the drive does not change.

Figure 1:
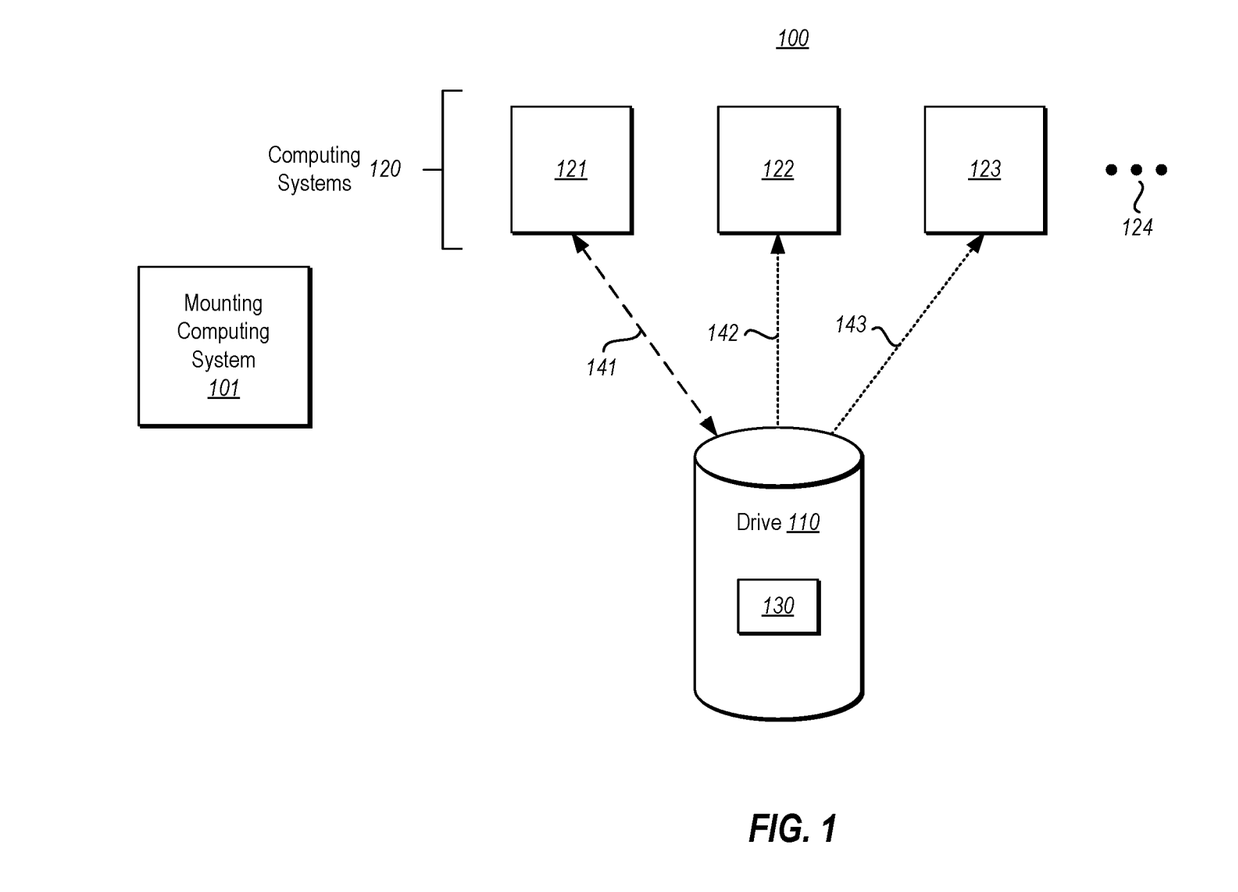
FIG. 1 illustrates an environment that includes a mounting computing system that mounts a drive to multiple computing systems.

FIG. 1 illustrates an environment 100 that includes a mounting computing system 101 that mounts a drive 110 to multiple computing systems 120. The mounting computing system 101 may be a computing system such as the computing system 600 described below with respect to FIG. 6. Each of the multiple computing systems 110 may also be a computing system such as the computing system 600 described below with respect to FIG. 6. The mounting computing system 101 may be a separate computing system, or may be one of the computing systems 120 (such as computing system 121). Alternatively, the mounting computing system 101 may be a larger computing environment that actually includes the computing system 121, the computing system 122, the computing system 123, and/or the drive 110.

The drive 110 may be a physical hard drive. Alternatively, the drive 110 may be a virtual hard drive. A virtual hard drive is a component that offers the appearance and behavior of (i.e., emulates) a hard drive to a computing system mounted thereto, even though the actual storage used to emulate the hard drive is abstracted away from view of the computing system, and may even be quite distributed.

The computing systems 101 and 120 may each be physical computing systems. Alternatively, one, some, or all of the computing systems 101 and 120 may each be a virtual machine. A virtual machine is a component that offers the appearance and behavior of (i.e., emulates) a computing system to a user, even though the functions of that virtual machine are performed by physical components that are abstracted away from the view of the user. Ideally, a user might not be able to tell that the user is working on a virtual machine as opposed to a physical computing system that performs the same function as the virtual machine.

The bi-direction dashed arrow 141 represents that the drive 110 is mounted as a writable (and potentially readable) drive for the computing system 121. The one-directional dotted arrow 142 represents that the drive 110 is mounted as only a readable drive for the computing system 122. Likewise, the one-directional dotted arrow 143 represents that the drive 110 is mounted as only a readable drive for the computing system 123. The ellipsis 124 represents that there is flexibility in the number of the computing systems 120 to which the drive 110 is mounted. The drive 110 may of course be mounted to just a single computing system. However, in accordance with the principles described herein, the drive may also be mounted to any plurality number of computing systems. In this case, there is one computing system that may write to the drive, whereas the other computing system(s) may only read from the drive. This avoids write corruption that would normally be expected when mounting a drive to multiple computing systems.

Figure 2:
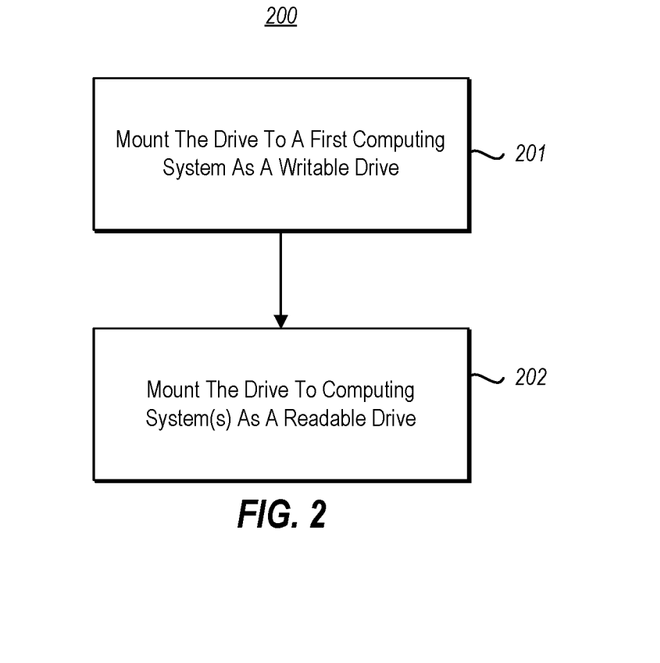
FIG. 2 illustrates a flowchart of a method for mounting a drive in accordance with the principles described herein.

FIG. 2 illustrates a flowchart of a method 200 for mounting a drive in accordance with the principles described herein. As an example, the method 200 may be performed by the mounting computing system 101 in order to mount the drive 110 to multiple computing systems, such as the computing systems 120. Thus, the method 200 will be described with reference to both FIG. 2 and FIG. 1. The method 200 may be performed by, for instance, one or more processors of the mounting computing system 101 executing one or more instructions that are structured such that, when executed by the one or more processors, the mounting computing system 101 is caused to perform the method 200.

The method 200 includes mounting the drive to a first computing system so as to be writable by the first computing system (act 201). For instance, in FIG. 1, the drive 110 is mounted to the computing system 121 as represented by the arrow 141. The computing system 121 may thus write to (and potentially also read from) the drive 110. The method 200 also includes mounting the drive 110 to a second computing system so as to be readable by the second computing system (act 202). For instance, in FIG. 1, the drive 110 is mounted to the computing system 122 as represented by the arrow 142. Thus, the first computing system and the second computing system both have concurrent access to the drive. Of course, to avoid the rare circumstance in which the computing system 122 attempts to read from data that is in the midst of being written to by the computing system 121 (and thus which may be corrupt), there may be appropriate access control. But otherwise, concurrent access to the drive 110 as a whole is enabled.

The method 200 may also include mounting the drive to yet further computing system(s) only as a readable drive (and not as a writable drive) so as to be readable by the computing system(s). For instance, in FIG. 1, the drive 110 is further mounted to the computing system 123 as represented by the arrow 143. Thus, the first computing system 121, the second computing system 122, and the third computing system 123, and potentially other computing systems (as represented by the ellipsis 124) may have concurrent access to the drive 110.

In one embodiment, the drive has thereon a single data structure of fixed size. For instance, in FIG. 2, the drive 110 has thereon a fixed-size data structure 130. Even though user data may be written into the fixed-size data structure 130, the state of the drive 110 would not change. This prevents corruption to the drive 110, and makes the state of the drive 110 predictable and stable. The "state" of a drive is the data that is stored on the drive that is not the user data itself, but information used to manage the user data. Such state may also be referred to as "management data" or "non-user data". In one embodiment, the single data structure may be a fixed-size log portion that is described further herein with respect to FIG. 4.

This mounting of a single drive to multiple computing systems may be especially beneficial in the case of there being a primary computing system that is supported by one or more fallback secondary computing systems. This might be the case when the primary computing system is running a very important process for which backup is necessary by one or more secondary computing systems. It is common in a variety of cloud applications to have a primary computing system with multiple secondary computing systems. For instance, in FIG. 1, computing system 121 may be a primary computing system, and each of computing systems 122 and 123 may be a secondary computing system.

If the primary computing system fails, failover occurs to one of the secondary computing systems, which will continue the process as a newly assigned primary computing system. This ensures that the process has sufficient redundancy so that the process is highly available. In this case, the primary computing system is operating upon the data, while the secondary computing systems read data preparing for the day they might be called upon to become the primary computing system.

Figure 3:
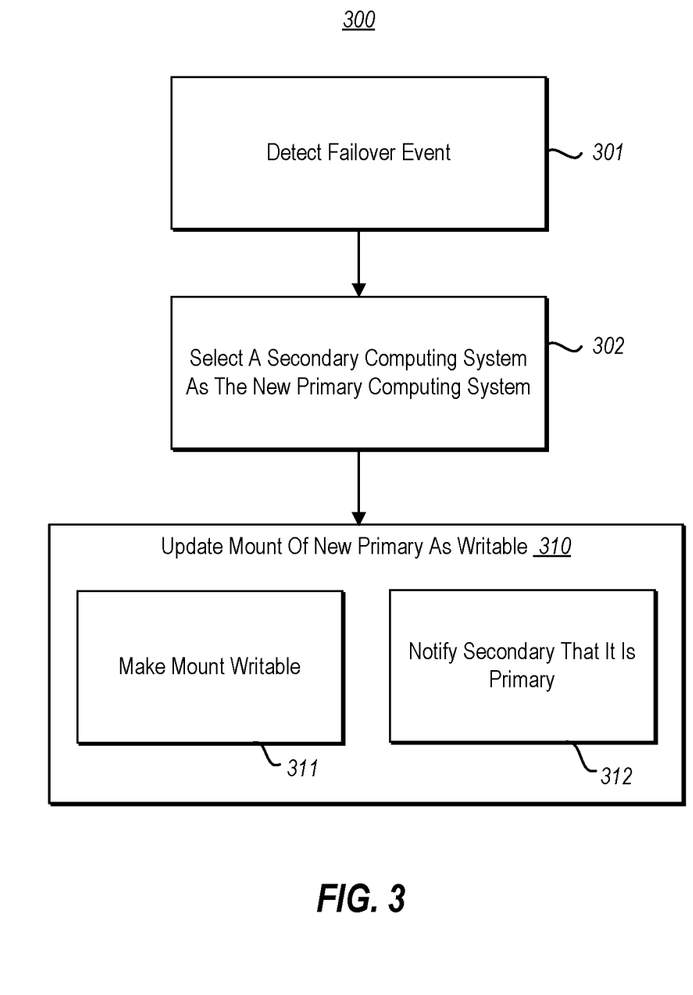
FIG. 3 illustrates a method for performing failover from a primary computing system to a secondary computing system when a failure of the primary computing system is detected.

FIG. 3 illustrates a method 300 for performing failover from a primary computing system to a secondary computing system when a failure of the primary computing system is detected. The method 300 is initiated upon detecting a failover event (act 301). The failover event may be, for instance, that the primary computing system is no longer functioning at an expected level. If that failover event occurs, a secondary computing system is selected as a new primary computing system (act 302). The drive mounted to that secondary computing system (i.e., the new primary computing system) is then updated (act 310) by 1) making the mount writable so that the new primary computing system may additionally write to the drive (act 311), and/or 2) notifying the new primary computing system that it is the primary computing system (act 312). In one embodiment, secondary computing system(s) are each always able to write to the drive, but they exercise their own control to prevent themselves from so doing, unless they are notified that they are the new primary computing system.

If failover is necessary, one of the secondary computing systems may be selected as the primary, and the mounting of the drive to the secondary computing system may be augmented to a writable mounting also, or the secondary computing system may simply be notified that it is now the primary computing system. This significantly reduces the time required to perform failover since a drive need not now be mounted to the secondary computing system as part of the failover. The drive is already present, and available. The time required for a secondary computing system to assume the role of primary computing system may be reduced from a matter of minutes or seconds, to perhaps milliseconds. This improves the seemlessness in the failover process.

Figure 4:
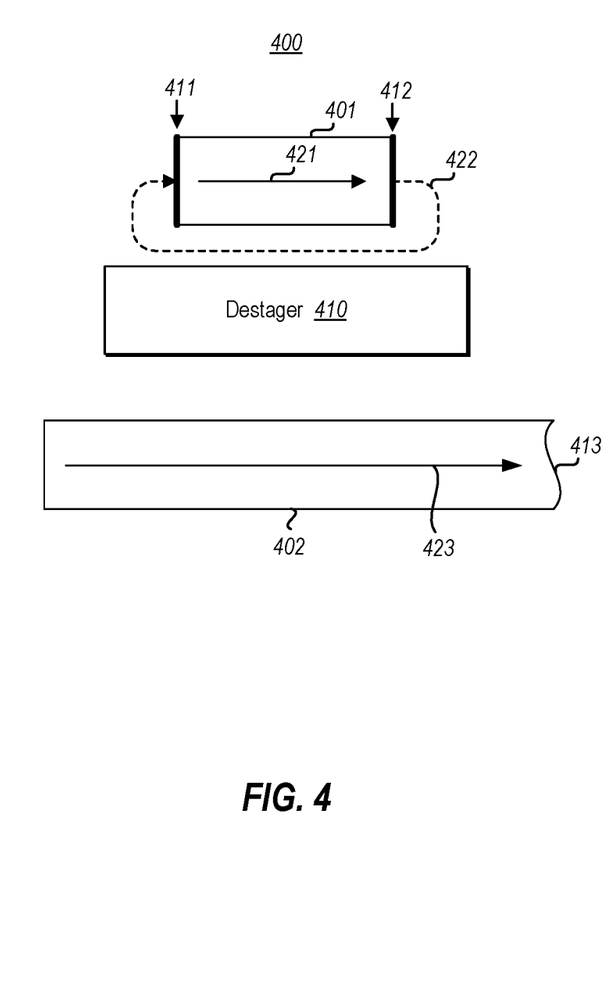
FIG. 4 illustrates a log environment in which the log is composed of two components—a fixed-sized log portion and a growable log portion.

FIG. 4 illustrates a log environment 400 in which there is a log that is composed of two components—a fixed-size log portion 401 and a growable log portion 402. The fixed-size log portion 401 is an example of the fixed-size data structure 130 that is the single file stored in the drive 110 of FIG. 1. The fixed-size log portion is fixed in size as symbolically represented by the boundaries 411 and 412 being thicker. The fixed-size log portion 401 includes the more recent log entries recorded in the log (and includes the tail of the log). As will become apparent further below, an advantage of the fixed-size log portion 401 being constant in size is that readers of the fixed-size log portion 401 are able to deterministically know where a log entry is located within the fixed-size log portion 401 using only the log sequence number of that log record. Furthermore, the fixed-size log portion is in a format that is designed to be safely shared between readers and writers. This simplifies the process of enabling readers to read log entries from the log. Furthermore, the fixed size of the fixed-size log portion 401 allows it to be the fixed-size data structure 130 of FIG. 1, so that user data may be written to the fixed-size log portion 401 without changing the non-user data on the drive 110.

The fixed-size log portion 401 is sequentially written to as represented by the arrow 421. When the end (e.g., end 412) of the fixed-size log portion 401 is encountered, the writing wraps back (as represented by dashed-lined arrow 422) to the beginning (e.g., beginning 411) of the fixed-size log portion 401 to continue writing to the log. Thus, the writing to the fixed-size log portion 401 occurs in circular fashion. Because of the circular write pattern, older log entries will be overwritten by newer log entries. Prior to that happening, a destager component 410 writes those older log entries sequentially onto the end (e.g., end 413) of the growable log portion 402. In this manner, the growable log portion 402 grows sequentially in direction 423. The growable log portion 402 is not stored within the drive 110, since growing a log would change the state of the drive 110, risking corruption when multiple computing systems are mounted to the drive 110.

Thus, the fixed-size log portion 401 includes newer log entries, which are the log entries that are most often read. On the other hand, the growable log portion 402 includes older log entries that are less often read. Furthermore, the fixed-size log portion 401 will include the tail of the log, which is the last log entry written to the log as a whole. In case of failure, it is important to be able to identify the tail of the log since that log entry is the last log entry that there is a guaranty will be executed even if there is a failure that occurs prior to the data operation represented by the log entry having been completed. During recovery, the recovery process restores the last checkpoint, and redoes the data operations of each log entry one at a time until the tail of the log is encountered.

Figure 5A:
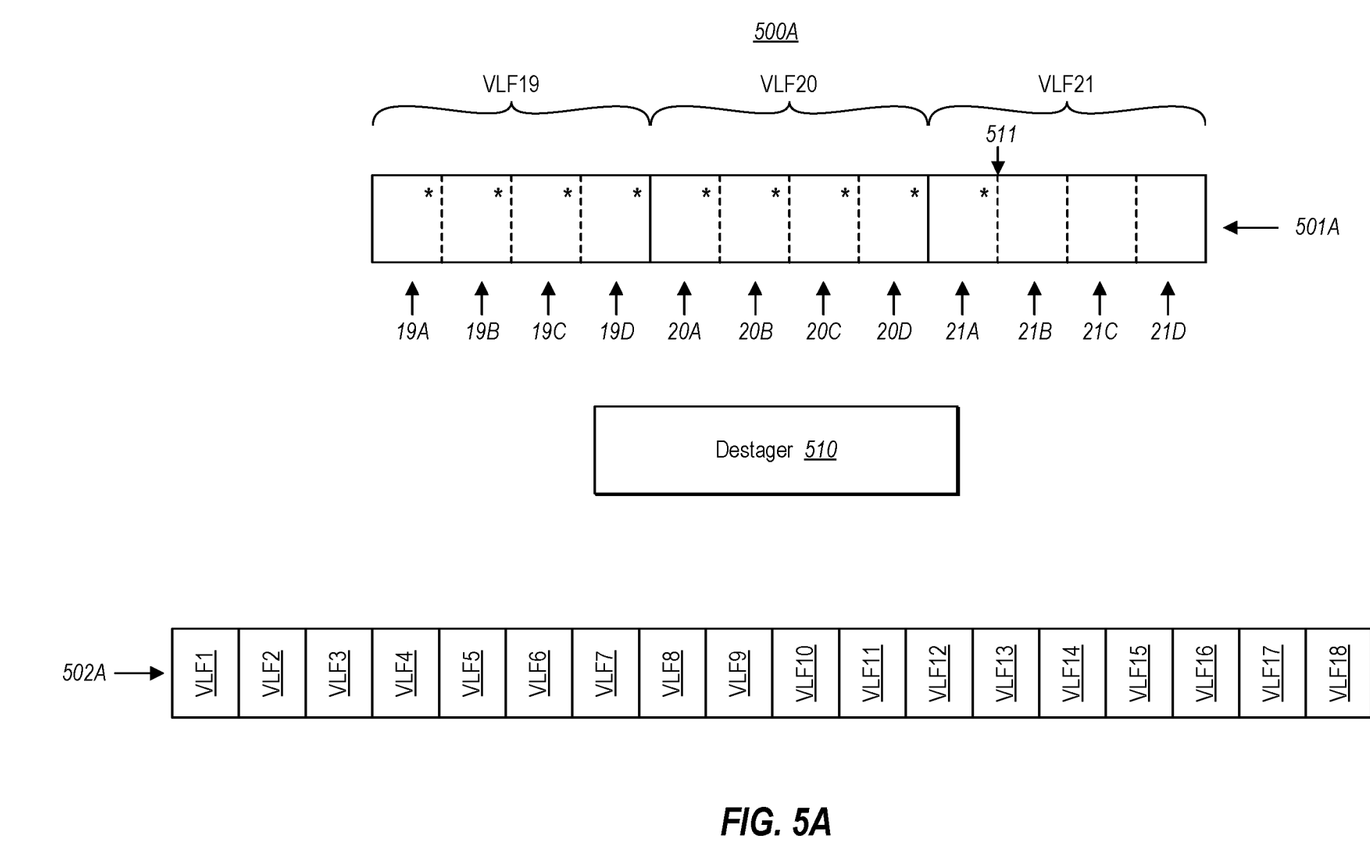
FIG. 5A illustrates a log environment that represents a specific example of the log environment of FIG. 4, and in which the fixed-size log portion includes three virtual log files (each having four blocks), and in which the growable log portion has therein eighteen virtual log files.

FIG. 5A illustrates a log environment 500A that represents a specific example of the log environment 400 of FIG. 4. The fixed-size log portion 501A of FIG. 5A represents an example of the fixed-size log portion 401 of FIG. 4. The growable log portion 502A of FIG. 5A represents an example of the growable log portion 402 of FIG. 4. In this example, and in one embodiment, the fixed-size log portion 501A is sized to include an odd number of sub-portions. For instance, a sub-portion may be a virtual log file. As will become apparent from the description below, an advantage of the log portion 501A being sized to include an odd number of virtual log files is that normal operation of initializing sub-portions is simplified, while still allowing recovery processes to find the tail of the log. In this specific example, the fixed-size log portion 501A is sized to include three virtual log files.

Suppose that thus far, the log is composed of 21 virtual log files (or "VLFs"), and that virtual log files are identified in sequential order as VLF1, VLF2, VLF3, and so forth. The fixed-size log portion 501A would include the last three virtual log files VLF19, VLF20, and VLF21. The older virtual log files VLF1 through VLF18 would have been previously destaged into the growable log portion 501A by the destager 510.

In this example, and as most apparent from the fixed-size log portion 501A, each portion (e.g., virtual log file) includes a fixed number of blocks. While a virtual log file may typically have a very large number of blocks, to keep the example simple, each virtual log file (e.g., VLF19 to VLF21) is illustrated as having four (4) blocks. For instance, virtual log file VLF19 is sequentially composed of blocks 19A to 19D, virtual log file VLF20 is sequentially composed of blocks 20A to 20D, and virtual log file VLF21 is sequentially composed of blocks 21A to 21D.

When a log record is written into the persistent log, a block that includes that log record is written into the fixed-size log file. Each log record within the block occurs a slot within the block. A log sequence number may thus be composed of a concatenation of a virtual log file identifier, a block identifier, and a slot identifier. Note that with the knowledge that the fixed-size log portion 501A has within it VLF19, VLF20 and VLF21 sequentially arranged in that order, any reader can get any log record within any of those virtual files with just the log sequence number. The block can be identified from the log sequence number allowing the proper block to be read. Then, the slot identifier from the log sequence number may be used to extract the proper log record from that block.

In any case, blocks are written by the primary compute system 110 one block at a time sequentially to the fixed-size log file. In the example of FIG. 5A, a block is represented as written to when it has an asterisk in the upper right corner. Thus, at the point in time illustrated in FIG. 5A, the tail of the log (represented by pointer 511) is just after the block 21A since block 21A is the last block written.

The destager 510 monitors the position of the tail of the log (i.e., the position of the most recent block written to) in the fixed-size log portion 501A, and ensures that any virtual log files that are about to be overwritten are destaged into the growable log portion 502A. Then, storage locations of the fixed-size log portion 501A that were used to store that newly-destaged virtual log file may be reused for a subsequent virtual log file.

Figure 5B:
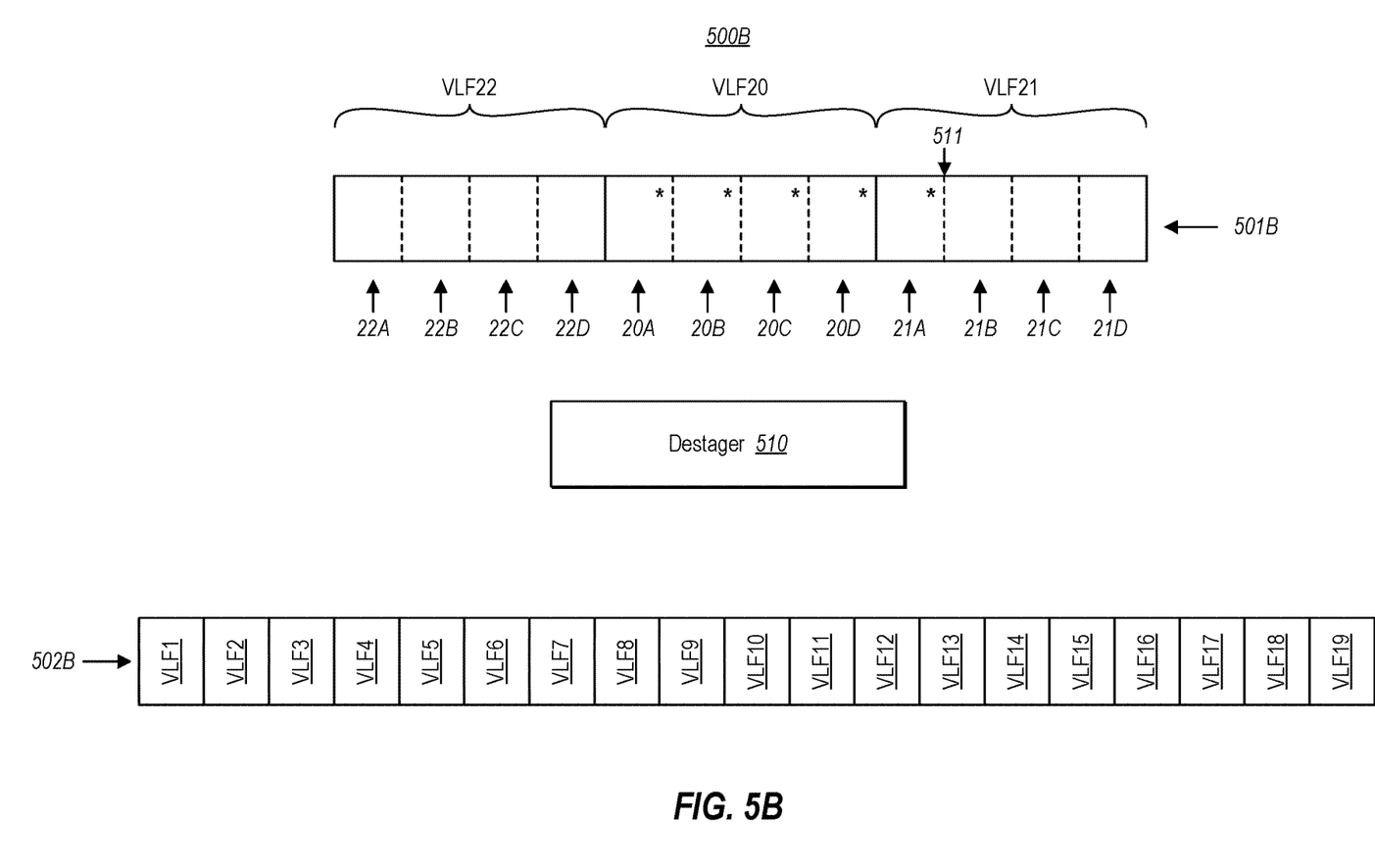
FIG. 5B illustrates a log environment that represents a subsequent state of the log environment of FIG. 5A after virtual log file VLF19 has been destaged, and the storage locations of the fixed-size log portion are reused by a subsequent virtual log file VLF22.

FIG. 5B illustrates a log environment 500B that represents a subsequent state of the log environment 500B after virtual log file VLF19 has been destaged, and the storage locations of the fixed-size log file 501A (now called labelled 501B) reused by a subsequent virtual log file VLF22 having blocks 22A, 22B, 22C and 22D. In this example, the sub-portion identifier (e.g., the virtual log file identifier) for each successively initialized sub-portion (e.g., a virtual log file) is incremented each time a new sub-portion (e.g., a virtual log file) is initialized within the fixed-size log portion. Note also that the growable log portion 502B has now grown by one virtual log file to now include virtual log file VLF19. In this example, the tail of the log 511 in FIG. 5B has not moved compared to the tail of the log in FIG. 5A. That is, the tail of the log 511 is still just after block 21A.

Now suppose that a checkpoint is taken at this point (right after block 21A is written to the fixed-size log portion 501B). Then, consistent with the sequential and circular writing pattern suppose that the following blocks are then written to in sequence into the fixed-size log portion 501B: block 21B, block 21C, block 21D, block 22A, and block 22B. The result will be the log environment 500C of FIG. 5C. Note now that the fixed-size log portion 501C has up to block 22B shown with an asterisk, and thus the tail of the log 511 is now just after block 22B. Furthermore, for convenience, the snapshot pointer 512 is represented for the convenience of the reader and will be referenced further below.

Figure 5C:
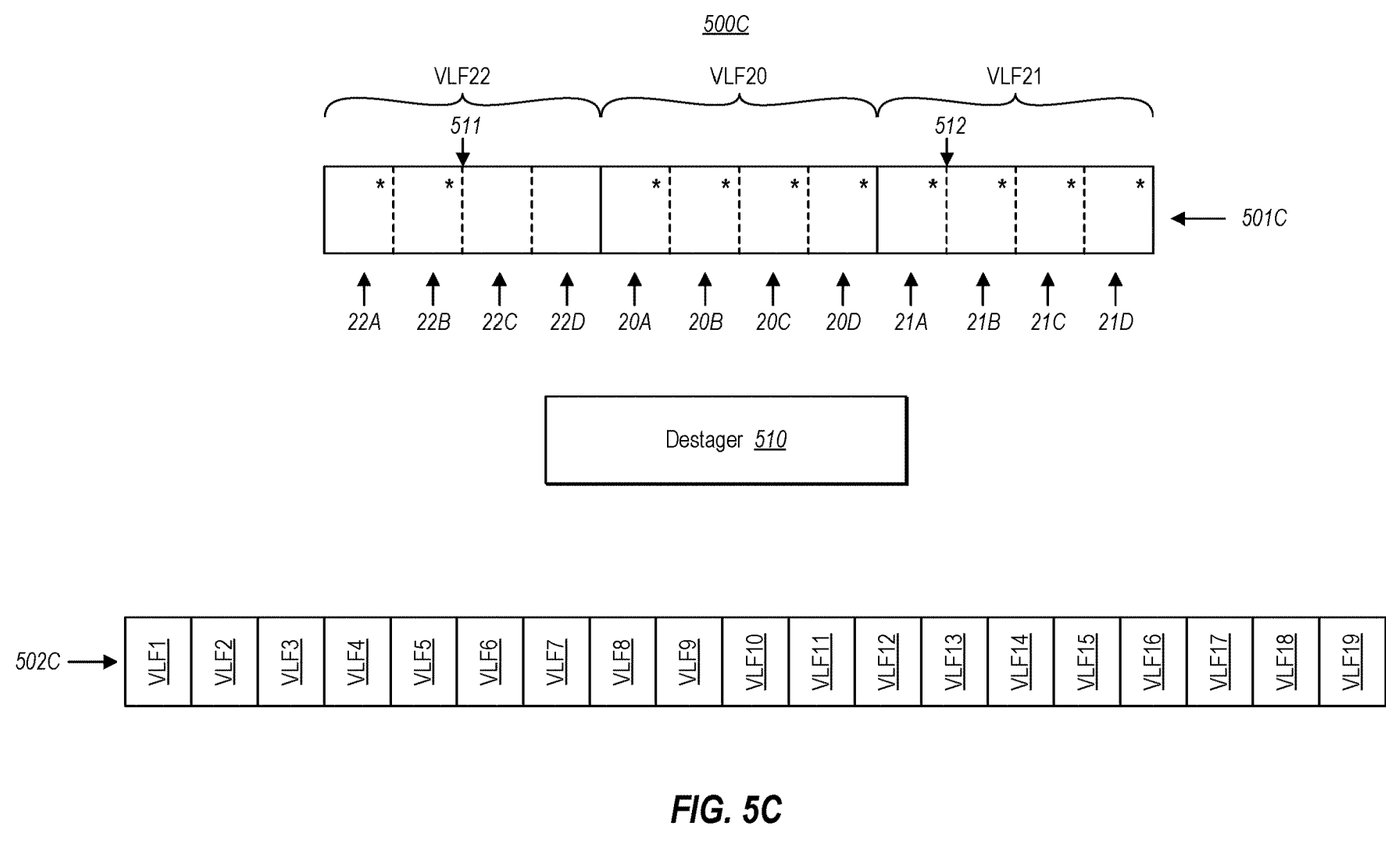
FIG. 5C illustrates a log environment that represents a subsequent state of the log environment of FIG. 5B after a checkpoint is taken at this point and after blocks are further written up to, and including, block 22B.

Now suppose that a failure occurs when the tail of the log 511 is just after block 22B (as shown in FIG. 5C). The task during recovery would be to first restore the most recent snapshot. In FIG. 5C, that would bring the state of the data up to just after the data operation for all of the log records within block 21A are executed. But to bring the data fully current, the recovery process executes all subsequent data operations represented by subsequent log records until the tail of the log (at point 511) is encountered. The problem though is identifying when the tail of the log is encountered. After all, the blocks 22C and 22D still have data in them, though it is the log records that were destaged as part of blocks 19C and 19D. Thus, it is important to recognize what blocks have been written to as part of the current virtual log file (VLF22), and distinguish those blocks from those blocks that have stale data from a prior circular write cycle.

In order to allow the recovery process to make this distinction, there is a new marker data within each block that, together with the current virtual log file identifier, allows the recovery process to deterministically conclude whether or not new data has been written to the block as part of the current virtual log file. In one embodiment, the new marker data may be two bits within a block. The value of these bits, in conjunction with the sub-portion identifier, allows the recover process to determine which blocks have been written to.

For instance, suppose that when writing to blocks of sub-portions having odd sub-portion identifiers (e.g. VLF19 or VLF 21), the two bits are written with a first possible value (e.g., 01). In that case, when writing to blocks of sub-portions having even sub-portion identifiers (e.g., VLF20 or VLF 22), the two bits are written with the second possible value (e.g., 10).

Figure 5D:
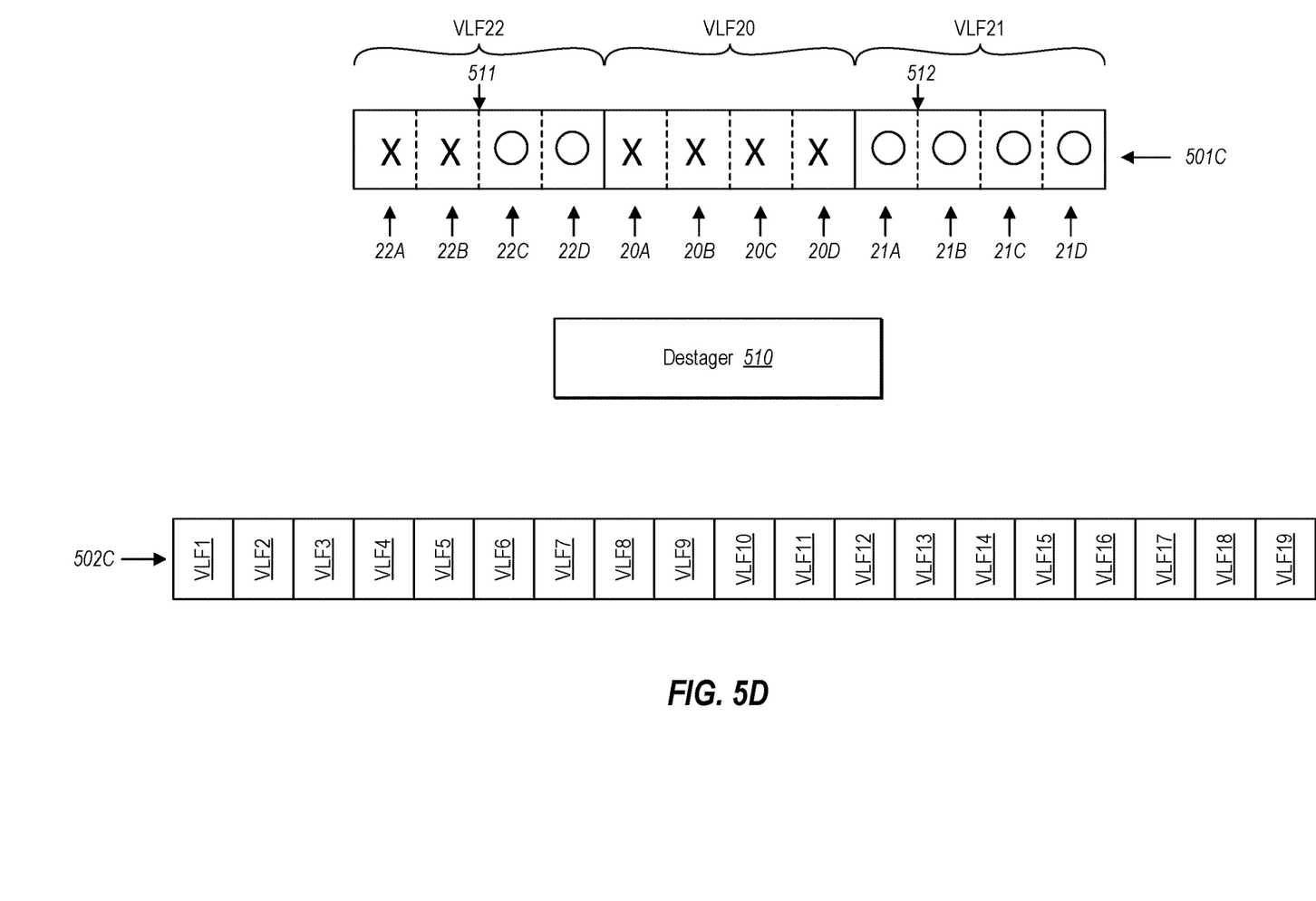
FIG. 5D illustrates the log environment of FIG. 5C, with Xs and Os inserted into the blocks to represent write marker bits that are tied to the virtual log file.

FIG. 5D is a log environment 500D that is the same as the environment 500C of FIG. 5C, except that an "O" fills those blocks that would have the bits 01 using the convention described in the previous paragraph, and that an "X" fills those blocks that would have the bits 10 using the convention described in the previous paragraph. The asterisks have been removed since they were used just for the convenience of the reader.

The sub-portion VLF20 has had all of its blocks written to (since the tail of the log is way forward in VLF22). Thus, because the sub-portion identifier VLF20 is even, the two bits would be 10, and thus the blocks 20A, 20B, 20C and 20D are shown as having an X. Of course, recovery should look for the tail of the log in the most recent sub-portion VLF22. However, even though the recovery does not need to look for the tail of the log in any of the prior sub-portions, if the recovery did examine sub-portion VLF20, the recovery would know that the tail of the log is not there.

The sub-portion VLF21 has had all of its blocks written to (since the tail of the log is way forward in VLF22). Thus, because the sub-portion identifier VLF21 is odd, the two bits would be 01, and thus the blocks 21A, 21B, 21C and 21D are shown as having an O. Thus, if the recovery did examine sub-portion VLF21, the recovery would know that the tail of the log is not there.

The sub-portion VLF22 has only some of its blocks written to since the tail of the log 511 is within the sub-portion VLF22. Specifically, because the sub-portion identifier VLF is even, the two bits of the two blocks 22A and 22B written to would be 10, and are thus shown with the "X" inside. However, note that the old data from VLF19 is still within blocks 22C and 22D. That old data was written to those blocks when the primary compute system was writing to blocks 19C and 19D as part of sub-portion VLF19. Since that data has not changed at all, the two bits of blocks 22C and 22D remain 01, and are thus marked with an "O" inside. Thus, without having to reformat the storage space that was used for sub-portion VLF19 when beginning to reuse the storage space for sub-portion VLF22, the recovery process may still find the tail of the log. This effect is achieved precisely because there are an odd number (three) of sub-portions within the fixed-size log portion, and the sub-portions are added with identifiers that alternate between even and odd (which happens when they monotonically increase by one each time).

Thus, the log written to the drive 110 may be optimized such that the more frequently accessed blocks (that include the most recent log records) are optimized so that any reader may read those blocks and access appropriate log records using only the log sequence number. Furthermore, the writes may happen during normal operation such that, in a subsequent recovery, the tail of the log may be quickly found, without having to expend effort reformatting the storage space in the fixed-size log portion. Thus, truly, the log service may acknowledge that the data operation is guaranteed to take place once the block having that log record is written into the log of the log environment 400 of FIG. 4.

Additionally, because the fixed-size log portion is fixed in size, the management data of the drive 110 stays the same. Also, as described above, the fixed-size log portion is designed to be safely shared between readers and writers in that the content is self-describing. This allows readers and the writer to be safe from torn writes and other concurrent access distortions even though the readers and write need not communicate with each other. Thus, the drive 110 can be mounted to multiple computing systems.

Because the principles described herein operate in the context of a computing system, a computing system will be described with respect to FIG. 6. Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 6:
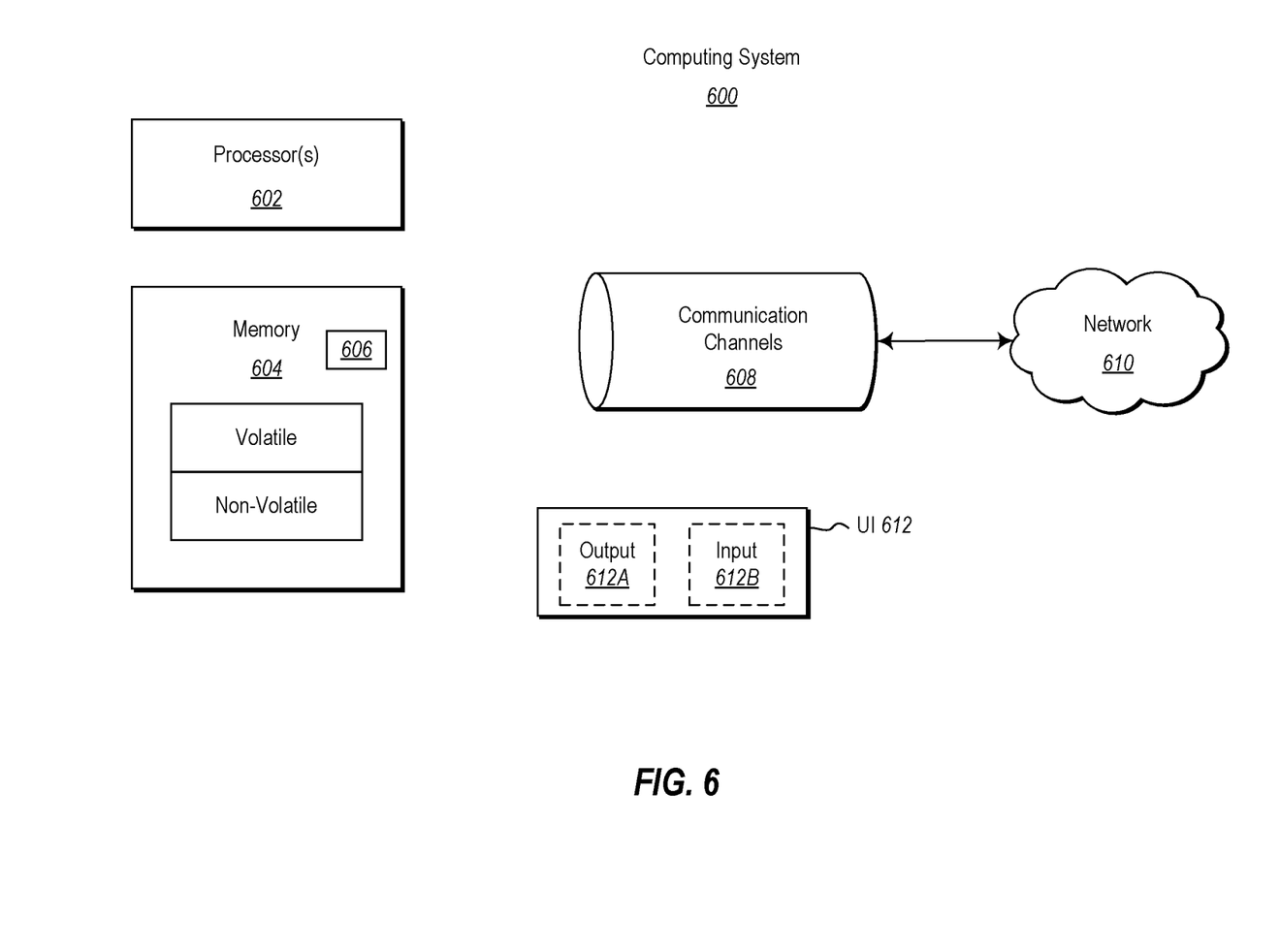
FIG. 6 illustrates an example computer system in which the principles described herein may be employed.

As illustrated in FIG. 6, in its most basic configuration, a computing system 600 typically includes at least one hardware processing unit 602 and memory 604. The memory 604 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 600 has thereon multiple structures often referred to as an "executable component". For instance, the memory 604 of the computing system 600 is illustrated as including executable component 606. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 604 of the computing system 600. Computing system 600 may also contain communication channels 608 that allow the computing system 600 to communicate with other computing systems over, for example, network 610.

While not all computing systems require a user interface, in some embodiments, the computing system 600 includes a user interface 612 for use in interfacing with a user. The user interface 612 may include output mechanisms 612A as well as input mechanisms 612B. The principles described herein are not limited to the precise output mechanisms 612A or input mechanisms 612B as such will depend on the nature of the device. However, output mechanisms 612A might include, for instance, speakers, displays, tactile output, holograms, virtual reality, and so forth. Examples of input mechanisms 612B might include, for instance, microphones, touchscreens, holograms, virtual reality, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A mounting computing system that mounts a drive to multiple computing systems, the mounting computing system comprising:
   one or more processors; and
   one or more hardware storage devices storing computer-executable instructions that are structured such that, when executed by the one or more processors, the computing system is caused to perform at least the following:
   mount the drive to a first computing system so as to be writable by the first computing system, the drive storing a single data structure of fixed size such that a state of the drive does not change in response to a write operation performed by the first computing system that is configured to overwrite a previous entry within the single data structure of fixed size; and
   mount the drive to a second computing system so that the single data structure of fixed size is readable, but not writable, by the second computing system, and so that the first computing system and the second computing system both have concurrent access to the drive.

2. The mounting computing system in accordance with claim 1, the first computing system being a primary computing system, the second computing system being a secondary computing system that serves as a fallback in case of a failover of the primary computing system.

3. The mounting computing system in accordance with claim 1, the computer-executable instructions being structured such that, when executed by the one or more processors, the computing system is further caused to perform at least the following:
   mount the drive to a third computing system so as to be readable by the third computing system, and so that the first computing system, the second computing system, and the third computing system all have concurrent access to the drive.

4. The mounting computing system in accordance with claim 1, the single data structure being a fixed-sized log portion of a log that includes the fixed-size log portion and a growable log portion that is not stored within the drive.

5. The mounting computing system in accordance with claim 4, wherein the write operation performed by the first computing system is further configured to cause the previous entry to be copied into the growable log portion.

6. The mounting computing system in accordance with claim 1, further comprising:
   the drive.

7. The mounting computing system in accordance with claim 1, further comprising:
   the first computing system.

8. The mounting computing system in accordance with claim 7, further comprising:
   the second computing system.

9. A method for mounting a drive, the method comprising:
   mounting the drive to a first computing system so as to be writable by the first computing system, the drive storing a single data structure of fixed size such that a state of the drive does not change in response to a write operation performed by the first computing system that is configured to overwrite a previous entry within the single data structure of fixed size; and
   mounting the drive to a second computing system so that the single data structure of fixed size is readable, but not writable, by the second computing system, and so that the first computing system and the second computing system both have concurrent access to the drive.

10. The method in accordance with claim 9, the first computing system being a primary computing system, the second computing system being a secondary computing system that serves as a fallback in case of a failover of the primary computing system.

11. The method in accordance with claim 10, further comprising the following when a failover event is detected:
   selecting the secondary computing system as a new primary computing system; and
   updating the mount of the drive to the new primary computing system so that the mount to the new primary computing system is additionally writable.

12. The method in accordance with claim 10, further comprising the following when a failover event is detected:
   selecting the secondary computing system as a new primary computing system; and
   notifying the new primary computing system that the new primary computing system may now write to the drive.

13. The method in accordance with claim 10, the primary computing system being a physical computing system.

14. The method in accordance with claim 10, the primary computing system being a virtual machine.

15. The method in accordance with claim 9, further comprising:
   mounting the drive to a third computing system so as to be readable by the third computing system, but not writable, and so that the first computing system, the second computing system, and the third computing system all have concurrent access to the drive.

16. The method in accordance with claim 9, the single data structure being a fixed-size log portion of a log that includes the fixed-size log portion and a growable log portion that is not stored within the drive.

17. The method in accordance with claim 16, wherein the write operation performed by the first computing system is further configured to cause the previous entry to be copied into the growable log portion.

18. The method in accordance with claim 9, the drive being a physical hard drive.

19. The method in accordance with claim 9, the drive being a virtual hard drive.

20. A computer program product comprising one or more hardware storage devices storing computer-executable instructions that are structured such that, when executed by one or more processors of a computing system, cause the computing system to perform at least the following:
   mount the drive to a first computing system so as to be writable by the first computing system, the drive storing a single data structure of fixed size such that a state of the drive does not change in response to a write operation performed by the first computing system that is configured to overwrite a previous entry within the single data structure of fixed size; and
   mount the drive to a second computing system so that the single data structure of fixed size is readable, but not writable, by the second computing system, and so that the first computing system and the second computing system both have concurrent access to the drive.

* * * * *